United States Patent
Ayub et al.

(10) Patent No.: US 8,927,137 B2
(45) Date of Patent: Jan. 6, 2015

(54) FAIL SAFE DAMAGE RESISTANT BATTERY MATRIX

(75) Inventors: Ilyas Ayub, Villa Park, IL (US); Kenneth Habegger, Naperville, IL (US); Matthew Umles, Chicago, IL (US); William Mark Batts, Elburn, IL (US); Albert Hopfer, Rolling Meadows, IL (US)

(73) Assignee: Microsun Technologies LLC, Woodridge, IL (US)

( * ) Notice: Subject to any disclaimer, the term of this patent is extended or adjusted under 35 U.S.C. 154(b) by 0 days.

(21) Appl. No.: 13/461,199

(22) Filed: May 1, 2012

(65) Prior Publication Data

US 2013/0295434 A1 Nov. 7, 2013

(51) Int. Cl.
*H01M 2/02* (2006.01)

(52) U.S. Cl.
USPC ........... 429/149; 429/151; 429/157; 429/158; 429/159; 429/160

(58) Field of Classification Search
CPC ................................. H01M 2/02; H01M 2/30
USPC .................................................. 429/149–160
See application file for complete search history.

(56) References Cited

U.S. PATENT DOCUMENTS

| | | | |
|---|---|---|---|
| 3,919,615 A | 11/1975 | Niecke | |
| 4,510,215 A | 4/1985 | Adam | |
| 5,308,717 A | 5/1994 | Gordin | |
| 5,505,629 A | 4/1996 | Majima et al. | |
| 5,680,026 A | 10/1997 | Lueschen | |
| 5,796,588 A | 8/1998 | Machida et al. | |
| 6,007,940 A | 12/1999 | Spotnitz | |
| 6,305,972 B1 | 10/2001 | Isbell et al. | |
| 6,319,631 B1 | 11/2001 | Bay et al. | |
| 6,365,297 B1 * | 4/2002 | Wolczak et al. | 429/159 |
| 6,459,032 B1 | 10/2002 | Luch | |
| 6,528,203 B1 | 3/2003 | Mitamura | |
| 6,599,657 B1 * | 7/2003 | Pollett et al. | 429/96 |
| 8,039,171 B2 * | 10/2011 | Seido et al. | 429/520 |

(Continued)

FOREIGN PATENT DOCUMENTS

| | | |
|---|---|---|
| JP | 3775396 B2 | 10/2004 |
| WO | WO-01-22518 | 3/2001 |
| WO | WO-2008-023199 | 2/2008 |

OTHER PUBLICATIONS

Kim Tai Hoon, International Search Report for Corresponding application PCT/US2013/038579, Sep. 17, 2013, Daejeon Metropolitan City, Republic of Korea.

*Primary Examiner* — Milton I Cano
*Assistant Examiner* — Ling R Zeng
(74) *Attorney, Agent, or Firm* — Babcock IP, PLLC

(57) ABSTRACT

A battery matrix provided with a plurality of battery cells; each of the battery cells provided with a positive terminal and a negative terminal. A positive trace grid and a negative trace grid, each provided as a conductive mesh with an array of apertures forming a plurality of alternative conductive paths across each of the positive and negative trace grids. Each of the battery cells coupled at the positive terminal to a positive trace pad of the positive trace grid and at the negative terminal to a negative trace pad of the negative trace grid. Alternatively, an intermediate trace grid may be introduced so that successive rows of the battery cells are coupled electrically in series with one another.

19 Claims, 7 Drawing Sheets

(56) References Cited

U.S. PATENT DOCUMENTS

| | | |
|---|---|---|
| 2005/0058900 A1 | 3/2005 | Benson et al. |
| 2009/0291361 A1 * | 11/2009 | Scorziello ............... 429/150 |
| 2011/0081568 A1 | 4/2011 | Kim et al. |
| 2011/0229754 A1 | 9/2011 | Zhao et al. |
| 2012/0135296 A1 * | 5/2012 | Itoi et al. ............... 429/159 |
| 2012/0214059 A1 | 8/2012 | Bauer |

* cited by examiner

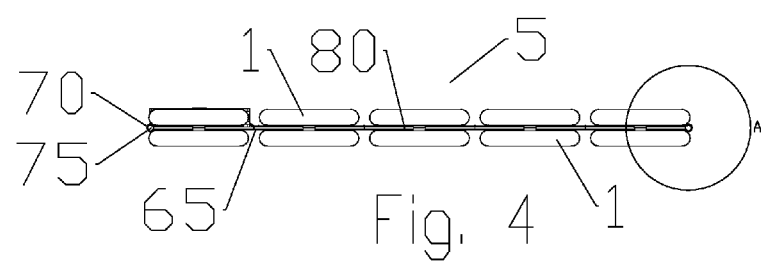
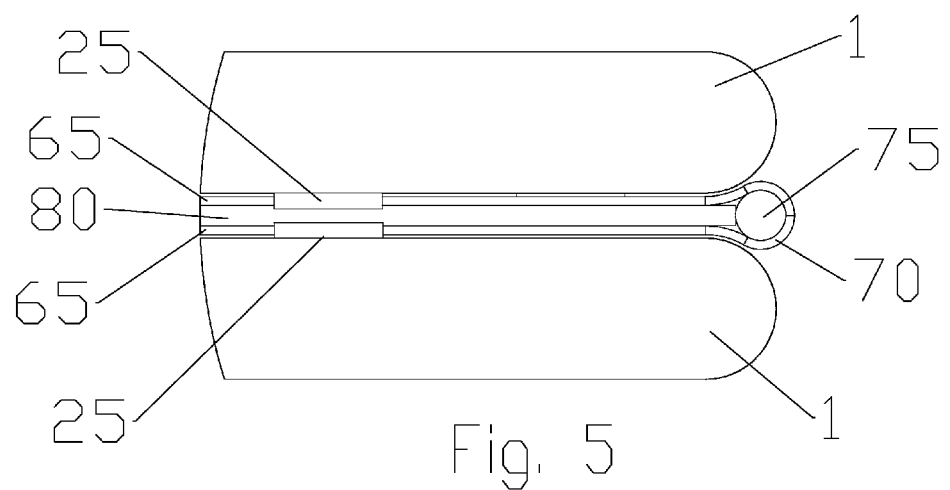

FAIL SAFE DAMAGE RESISTANT BATTERY MATRIX

BACKGROUND

1. Field of the Invention

The invention relates to an electrical power storage system. More specifically, the invention relates to a multiple cell battery system with penetration survivability and fail safe characteristics.

2. Description of Related Art

Battery systems may be utilized to provide mobile and/or remote location electrical power. As electrical power storage capacity is increased, battery systems become an increasing threat to users should the battery system suffer mechanical damage and/or control failure. Failure modes of battery systems may include sudden high current discharge, extreme heat, fire and/or explosion.

Integrated communications and/or weapons gear utilized, for example, by law enforcement and/or military personnel requires increasingly high levels of power storage carried proximate the users body. In addition to conventional wear and tear, in extreme situations and/or battle environments these power storage systems may be subject to penetration damage from shrapnel and/or projectiles. If damaged, the potentially explosive rapid power discharge failure modes of these power storage systems may become a further threat to the user.

One method of improving the safety of power storage systems is to armor the battery enclosures and/or distribute an increased number of smaller enclosures. However, these solutions may unacceptably increase the weight of the resulting systems, reducing mobility.

Competition within the mobile electrical power storage industry has focused attention upon increasing power capacity and improving the overall user safety of these systems while simultaneously reducing their size and weight.

Therefore, it is an object of the invention to provide a mobile electrical power storage system that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 4 is a schematic bottom view of the battery matrix of FIG. 1.

FIG. 5 is a close-up view of area A of FIG. 4.

DETAILED DESCRIPTION

Penetration fault testing by the inventors indicates that commonly applied battery cell chemistries, such as lithium cobalt, may be reactive to air and/or humidty upon exposure, for example via battery enclosure penetration and/or breach. In particular it has been discovered that such compounds proximate the anode of the battery cell 1 are highly reactive while compounds of the battery cell 1 proximate the cathode are comparatively non-reactive.

Figure 1:
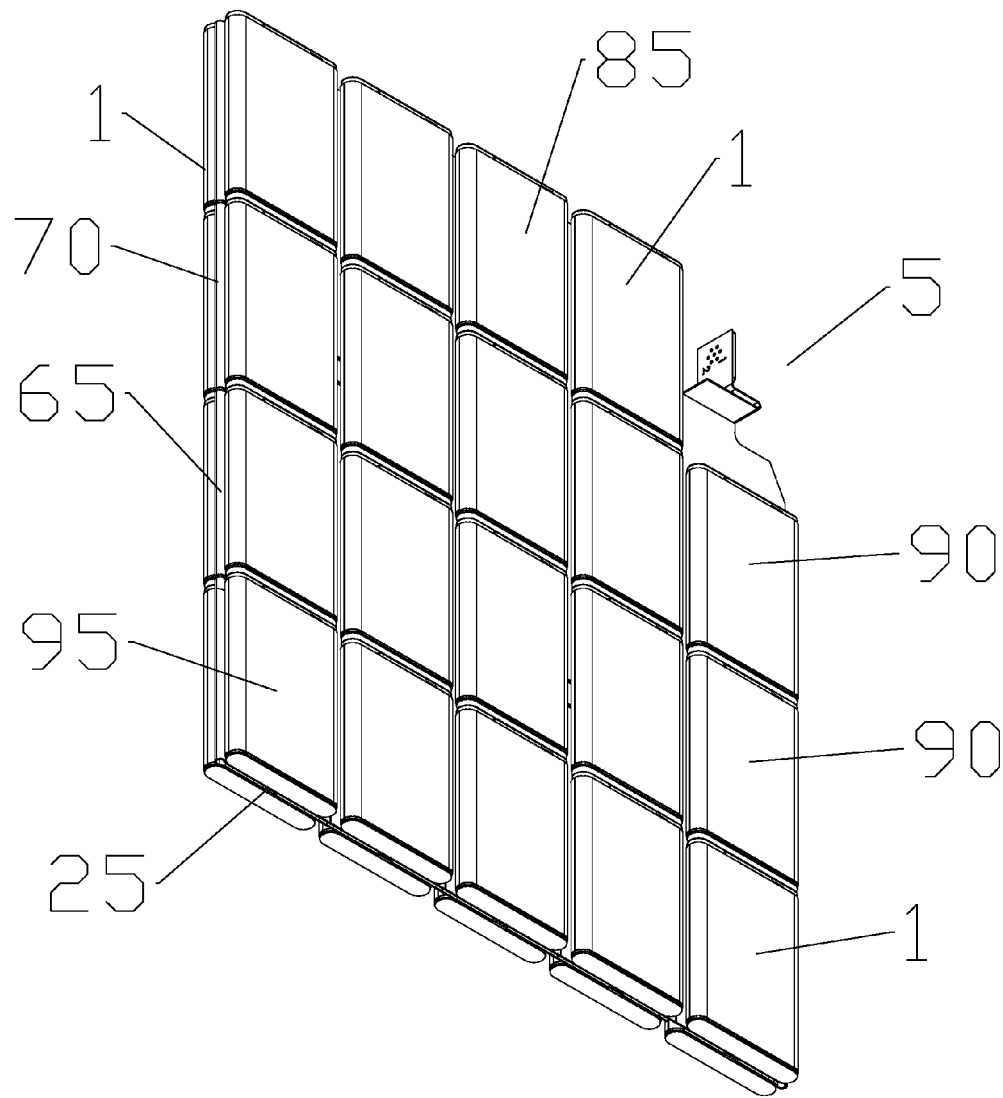
FIG. 1 is a schematic isometric back view of an exemplary battery matrix, without a jacket.
Figure 2:
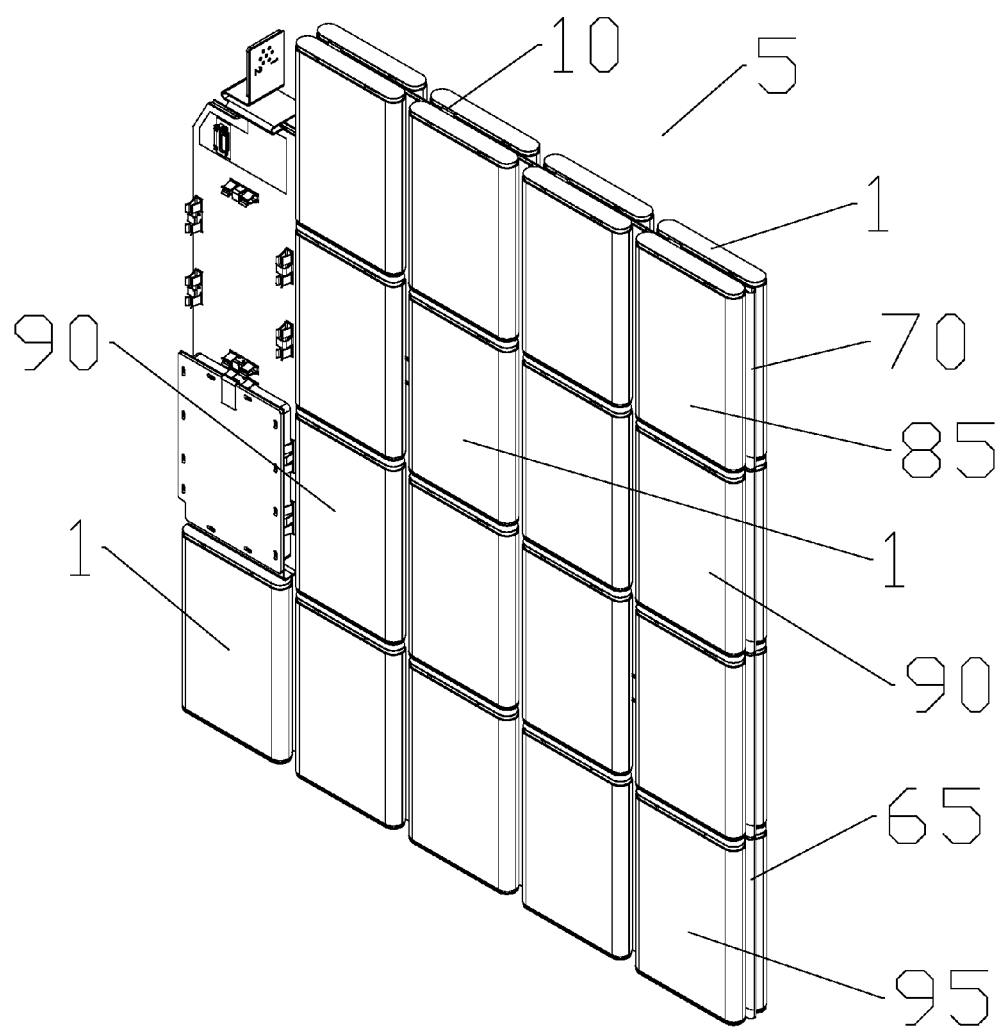
FIG. 2 is a schematic isometric front view of the battery matrix of FIG. 1.

As shown for example in FIGS. 1 and 2, a battery matrix 5 comprises a plurality of battery cells 1 coupled together to provide electrical power to a desired electrical load. A positive terminal 10 of each battery cell 1 is coupled to a positive trace pad 15 of a positive trace grid 20 and a negative terminal 25 of each battery cell 1 is coupled to a negative trace pad 30 of a negative trace grid 35 (or alternatively the positive and negative terminals may be coupled to an succession of intermediate trace grids 40 as explained herebelow). Thereby, the plurality of battery cells 1 may be coupled electrically in parallel with one another.

The positive and negative trace grids 20, 35 are each provided as a conductive mesh 45 with an array of apertures 50 forming a plurality of alternative conductive paths along and across each of the positive and negative trace grids 20, 35. Should a portion of the conductive mesh 45 be damaged, for example by destructive penetration and/or tear, although a portion of the conductive mesh 45 may be broken, an alternative electrical path will be provided by the remainder of the conductive mesh 45 around/past a damaged area of the conductive mesh 45.

Figure 3:
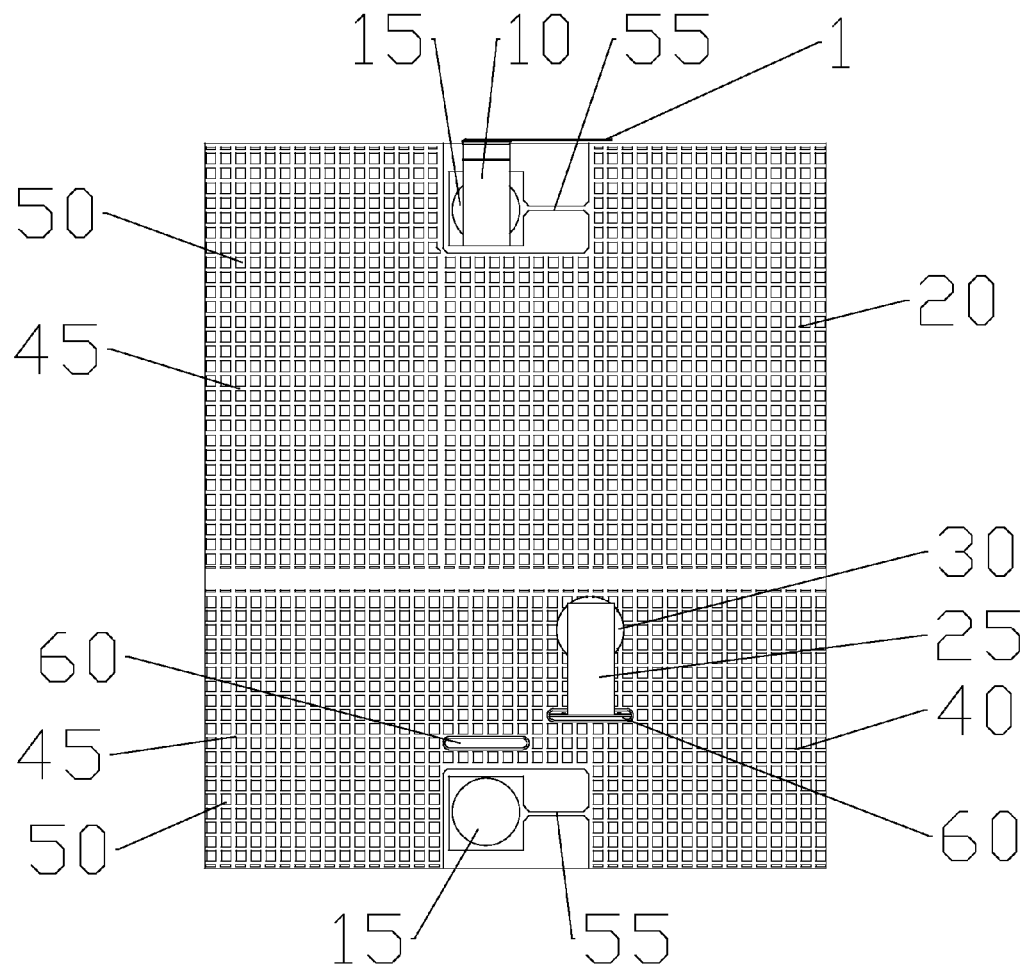
FIG. 3 is a schematic close-up view of a portion of flexible substrate as shown in FIG. 6, demonstrated with one battery cell attached.

As best shown in FIG. 3, a fuse trace 55 may be provided, preferably between each positive trace pad 15 and the positive trace grid 20. A cross section area of the fuse trace 55 may be dimensioned to break at a predetermined current level that is less than a current capacity of each alternative electrical path. Thereby, should a failure of a battery cell 1 occur that results in a current overload, the fuse trace 55 of the damaged battery cell 1 would break, isolating that battery cell 1 from the remainder of battery cells 1 in the battery matrix 5. Further, should control circuits fail and extended excessive current draw upon a battery cell 1 occur that might result in a dangerous battery cell 1 overheating situation, the fuse trace 55 will break from the excess current, fail-safe deactivating the battery matrix 5 before dangerous temperature levels that could trigger an explosive battery cell 1 failure are reached.

A penetration failure of a battery cell 1 proximate the anode (coupled to the positive terminal 10) is believed to be the most dangerous position for a penetration failure to occur. By locating the fuse trace 55 proximate the positive trace pad 15, a penetration in this area may also simultaneously fail-safe break the fuse trace 55 even prior to an electrical failure of the battery cell 1, due to the proximity of the fuse trace 55 to the positive terminal 10 and thus the anode of the battery cell 1.

The positive and/or negative terminals 10, 25 of each battery cell 1 may be fed through a terminal slot 60 of the respective positive, intermediate and/or negative trace grid 20, 40, 35. Thereby, the positive and negative terminals 10, 25 also operate as a mechanical hanger for retaining the battery cell upon the respective positive, intermediate and/or negative trace grids 20, 35, 40, improving a mechanical linkage between the battery cell 1 and the trace grids by reducing stress upon the, for example solder and/or adhesive, interconnection between the positive or negative terminal 10, 25 and a positive or negative trace pad 15, 30.

Where the battery cell 1 is at the top of the battery matrix 5, for example as shown in FIG. 3, the positive trace pad 15 may be positioned so that the positive terminal 10 may wrap over the top edge of the positive trace grid 20. Similarly, where the battery cell 1 is at the bottom of the battery matrix 5, the negative trace pad 30 may be positioned so that the negative trace pad 30 is at the bottom of the negative trace grid 35 so that it can wrap around the bottom edge of the negative trace grid 35.

The positive, intermediate and negative trace grids 20, 40, 35, may be formed on a flexible substrate 65 formed from a polymer material, such as a poly amid material.

Figure 6:
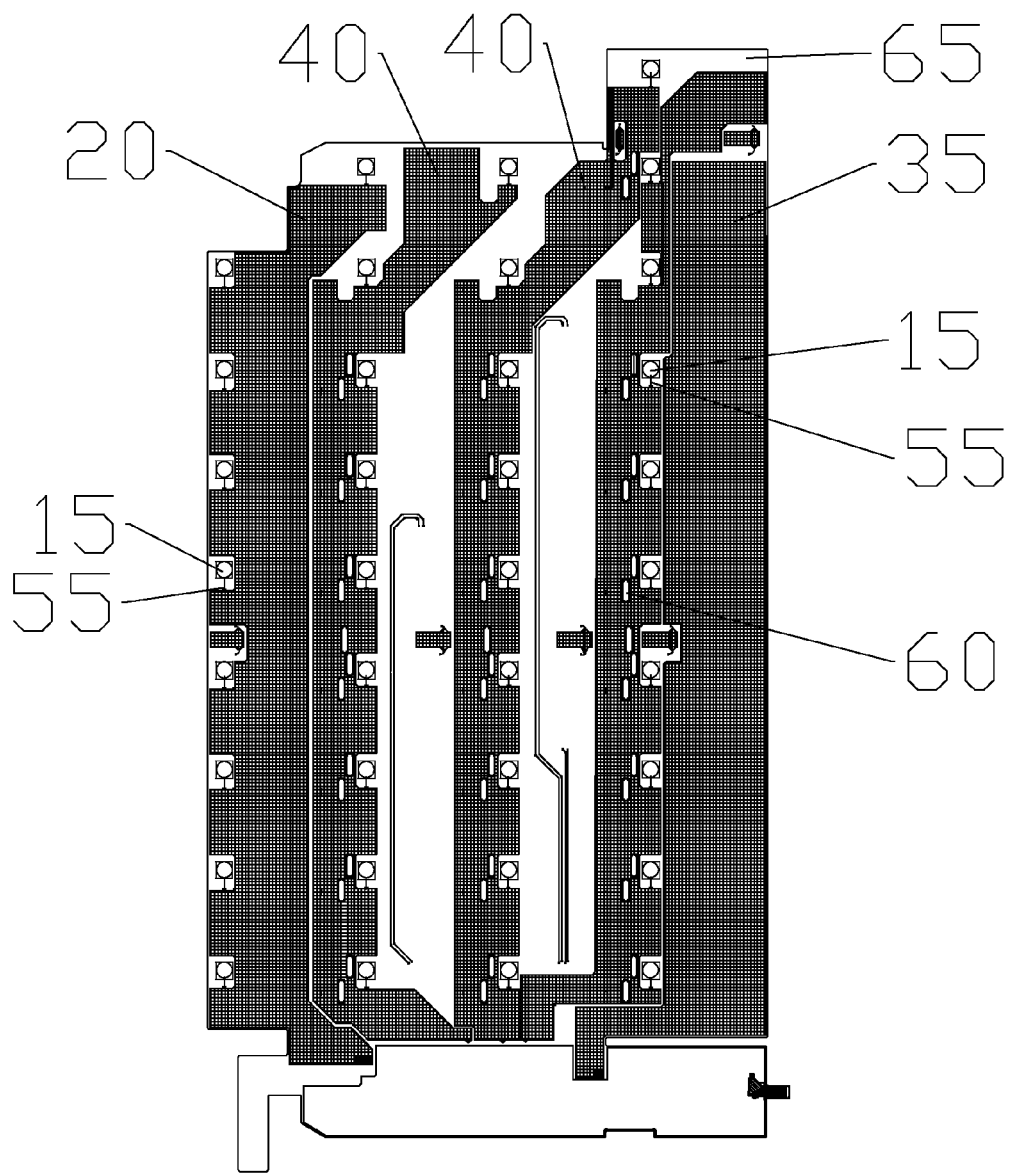
FIG. 6 is a schematic front view of the flexible substrate of the FIG. 1 battery matrix.

To reduce the size of the resulting battery matrix 5, the flexible substrate 65 may be folded upon itself from one or more sides such that battery cells 1 attached to the flexible substrate 65 are aligned, for example back to back and as shown in FIGS. 4 and 5. To enable folding of the flexible substrate 65 back upon itself, a bend portion 70 of the flexible substrate 65 may be supported by a bend radius support rod 75 around which the flexible substrate 65 is folded. The bend radius support rod 75 may be provided with an outer diameter greater than a minimum bend radius characteristic of the flexible substrate 65, for example twice a thickness of the flexible substrate 65. The bend radius support rod 75 may be formed, for example, from a polymer material with flexible characteristics such as delrin. For ease of electrical isolation between back to back positive and/or negative battery terminals, a dielectric sheet 80 may be applied there between.

Where only a positive and negative trace grid 20, 35 are utilized, each of the battery cells 1 coupled thereto are provided in a parallel electrical configuration in which the resulting voltage is that of each battery cell 1. To increase the voltage available to the system load, and further improve the survivability of the resulting battery matrix 5, the battery cells 1 may also be coupled in series with one another via one or more intermediate trace grids 40, for example as shown in FIG. 6. In a series interconnection, the positive terminals 10 of a primary row 85 of battery cells 1 are coupled to the positive trace grid 20 and the negative terminals 25 to the intermediate trace grid 40. A secondary row 90 of battery cells 1 then has each positive terminal 10 coupled to the intermediate trace grid 40 and the negative terminal 25 either to a further intermediate trace grid 40 or if it is the final row 95, to the negative trace grid 35.

Figure 7:
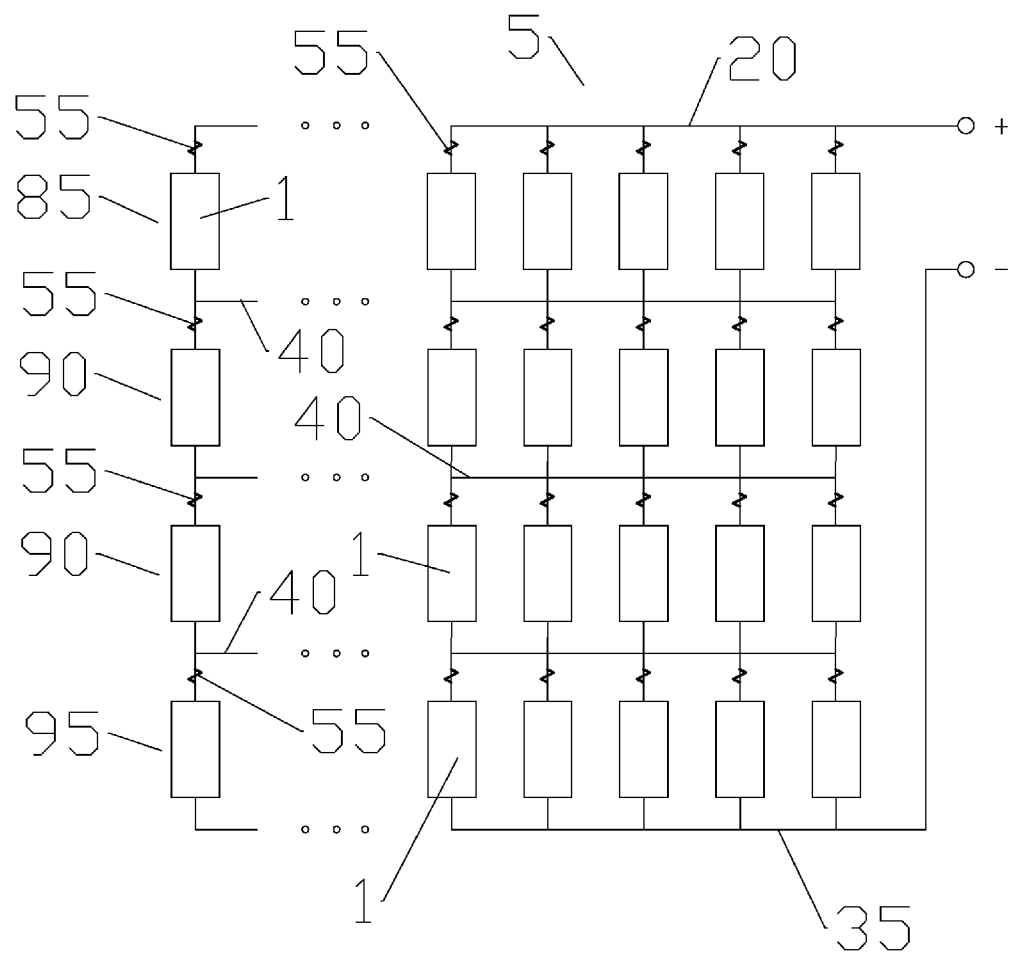
FIG. 7 is a schematic electrical circuit diagram of exemplary battery cell electrical interconnections.

As shown in FIG. 7, the resulting electrical circuit may be expanded in parallel and/or series to achieve a battery matrix 5 with the desired size, voltage and/or power rating. One skilled in the art will recognize that the resulting battery matrix 5 is highly fault tolerant. Should one or more battery cells 1 be damaged and their power output terminated, for example by penetration damage and/or fuse trace 55 disconnect, the parallel and series interconnection by row of the remaining battery cells 1 enables the desired electrical output to be maintained based upon the power capacity of the remaining battery cells 1. The flexible substrate 65 may also be utilized for control and/or monitoring circuitry, such as temperature sensors and power routing to intelligent charging/power status circuitry also incorporated into the battery matrix 5.

Figure 8:
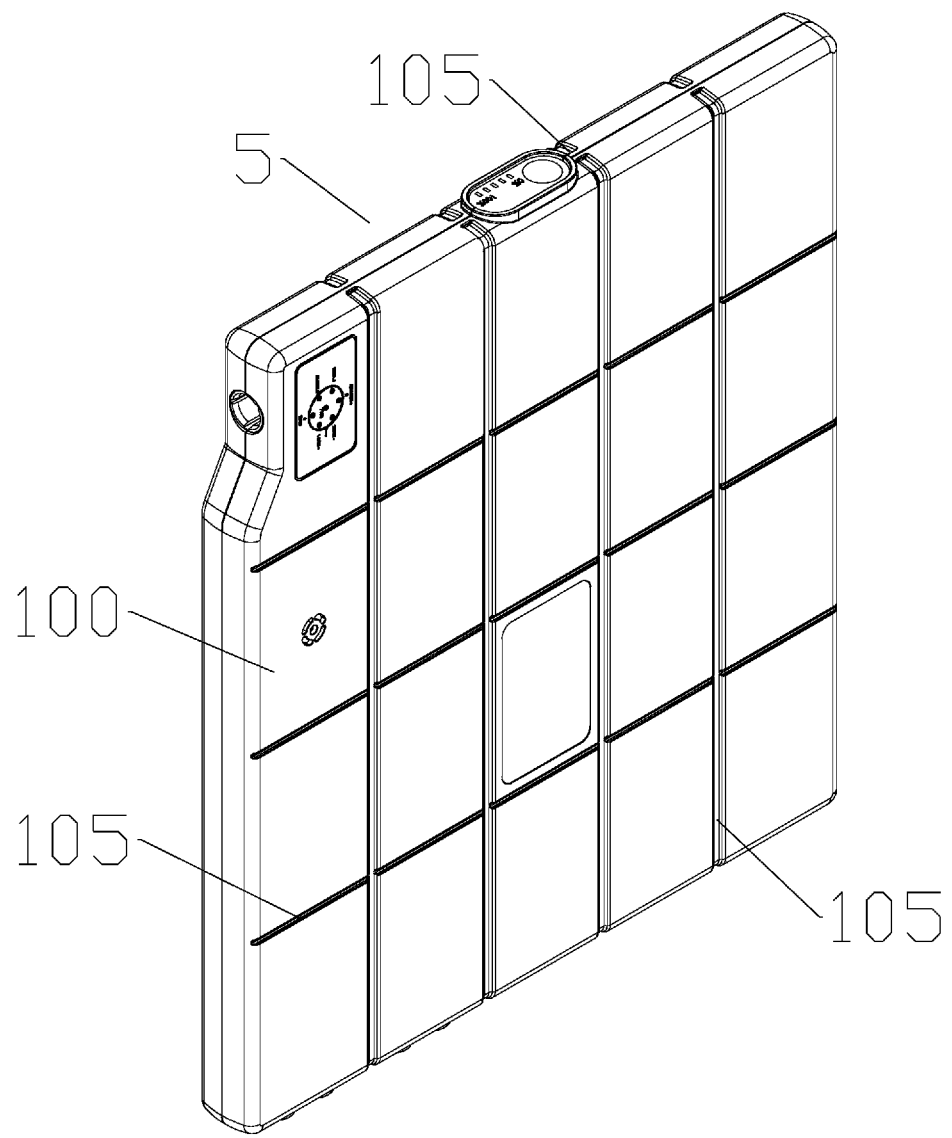
FIG. 8 is a schematic front isometric view of the battery matrix of FIG. 1, with a jacket.

As shown for example in FIG. 8, the battery cells 1 mounted upon the trace grids forming the battery matrix 5 may be encapsulated in a jacket 100 of, for example, polymer material to further increase the overall strength, shock and vibration failure characteristics of the battery matrix 5. Where the battery cells 1 are provided in a single layer and/or aligned back to back, flexure joints 105 may be applied to the jacket 100 between columns and/or rows of the battery cells 1 to provide the battery matrix 5 with a limited bend characteristic there along to enable close conformity of the battery matrix 5 to the contours of the user, for example mounted to a side panel or the like of a soldier and/or law enforcement officer's body armor assembly.

One skilled in the art will appreciate that the battery matrix 5 has numerous advantages over a monolithic battery cell and/or conventional multiple cell battery packs. The multiple separate but parallel and/or series interconnected battery cells 1 provide a significant increase in fail-safe survivability, should a portion of the battery matrix 5 suffer damage. The trace grids interconnecting the battery cells 1 are also failure resistant due to the availability of multiple redundant electrical paths across each trace grid. The incorporation of fuse traces 55 into the trace grids also enables ready short circuit and/or over current protection, without requiring installation of a dedicated additional fuse element. A particular danger identified by the inventors that of penetration damage proximate a battery cell's anode may be minimized by the back to back battery cell 1 placement enabled by the foldable characteristic of the flexible substrate 65 and further enhanced by the use of one or more bend radius support rods 75. Finally, the jacket 100 encapsulated battery matrix 5 may be provided with a limited bend characteristic via flexure joints 105 formed between columns and/or rows of the individual battery cells, improving conformability when worn by a user and thereby overall mobility.

| Table of Parts | |
|---|---|
| 1 | battery cell |
| 5 | battery matrix |
| 10 | positive terminal |
| 15 | positive trace pad |
| 20 | positive trace grid |
| 25 | negative terminal |
| 30 | negative trace pad |
| 35 | negative trace grid |
| 40 | intermediate trace grid |
| 45 | conductive mesh |
| 50 | aperture |
| 55 | fuse trace |
| 60 | terminal slot |
| 65 | flexible substrate |
| 70 | bend portion |
| 75 | bend radius support rod |
| 80 | dielectric sheet |
| 85 | primary row |
| 90 | secondary row |
| 95 | final row |
| 100 | jacket |
| 105 | flexure joint |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A battery matrix, comprising:
a plurality of battery cells; each of the battery cells provided with a positive terminal and a negative terminal;
a positive trace grid and a negative trace grid, each provided as a conductive mesh with an array of apertures forming a plurality of alternative conductive paths across each of the positive and negative trace grids;
each of the battery cells coupled at the positive terminal to a positive trace pad of the positive trace grid and at the negative terminal to a negative trace pad of the negative trace grid.

2. The battery matrix of claim 1, further including a fuse trace between the positive trace pad and the positive trace grid;
the fuse trace provided with a cross section area dimensioned to break at a predetermined current level which is less than a current capacity of each of the alternative conductive paths.

3. The battery matrix of claim 1, further including a negative terminal slot in the negative trace grid; the negative terminal passing through the negative terminal slot and folded into contact with the negative trace pad.

4. The battery matrix of claim 1, wherein the positive trace grid and the negative trace grid are formed on a flexible substrate.

5. The battery matrix of claim 4, wherein the flexible substrate is folded upon itself.

6. The battery matrix of claim 4, wherein a bend portion of the flexible substrate is supported by a bend radius support rod around which the flexible substrate is folded; the bend radius support rod having a diameter greater than a minimum bend radius characteristic of the flexible substrate.

7. The battery matrix of claim 1, wherein the battery matrix is encapsulated in a polymer material.

8. The battery matrix of claim 7, wherein the battery matrix is encapsulated in a polymer material, the battery matrix flexible between adjacent battery cells.

9. A battery matrix, comprising:
a plurality of battery cells; each of the battery cells provided with a positive terminal and a negative terminal;
a positive trace grid, an intermediate trace grid and a negative trace grid, each provided as a conductive mesh with an array of apertures forming a plurality of alternative conductive paths across each of the positive, intermediate and negative trace grids;
a primary row of the battery cells each coupled between:
the positive terminal and a positive connection pad of the positive trace grid, and the negative terminal and a negative connection pad of the intermediate trace grid;
a secondary row of the battery cells each coupled between:
the positive terminal and a positive connection pad of the intermediate trace grid, and the negative terminal and a negative connection pad of the negative trace grid.

10. The battery matrix of claim 9, wherein the primary row of battery cells is coupled in parallel with one another and in series with the secondary row of battery cells which are coupled in parallel with one another.

11. The battery matrix of claim 9, further including a fuse trace between the positive trace pad of the positive trace grid and positive trace grid and a fuse trace between the positive trace pad of the intermediate trace grid and the intermediate trace grid;
the fuse trace configured to break at a predetermined current level which is less than a current capacity of each of the alternative conductive paths.

12. The battery matrix of claim 9, further including a negative terminal slot in the negative trace grid; the negative terminal passing through the negative terminal slot and folded into contact with the negative trace pad.

13. The battery matrix of claim 9, wherein the positive trace grid, intermediate trace grid and the negative trace grid are formed on a flexible substrate.

14. The battery matrix of claim 13, wherein the flexible substrate is folded upon itself, whereby at least one of the plurality of batteries is aligned back to back with another of the plurality of batteries.

15. The battery matrix of claim 13, wherein a bend portion of the flexible substrate is supported by a bend radius support rod around which the flexible substrate is folded; the bend radius support rod having a diameter greater than a minimum bend radius characteristic of the flexible substrate.

16. The battery matrix of claim 9, wherein the battery matrix is encapsulated in a polymer material.

17. The battery matrix of claim 13, wherein the battery matrix is encapsulated in a polymer material, flexible between adjacent battery cells.

18. The battery matrix of claim 9, further including an intermediate row of the battery cells each coupled between: the positive terminal and a positive trace pad of a first intermediate trace grid, and the negative terminal and a negative trace pad of a second intermediate trace grid.

19. The battery matrix of claim 9, further including a positive terminal slot in the intermediate trace grid; the positive terminal passing through the positive terminal slot and folded into contact with the positive trace pad.

* * * * *